United States Patent [19]

Rowley

[11] Patent Number: 4,896,391
[45] Date of Patent: Jan. 30, 1990

[54] METHOD OF FORMING A SELF-LOCKING FASTENER

[75] Inventor: Terry J. Rowley, Fairfield, Ohio

[73] Assignee: Long-Lok Fasteners Corporation, Lancaster, Tex.

[21] Appl. No.: 331,512

[22] Filed: Mar. 31, 1989

Related U.S. Application Data

[62] Division of Ser. No. 629,200, Jul. 9, 1984, abandoned.

[51] Int. Cl.⁴ .......................... B21K 1/44; B21K 1/56
[52] U.S. Cl. ..................................... 10/10 P; 10/27 R
[58] Field of Search .................. 10/10 R, 10 P, 27 R; 72/88, 90; 411/304, 306, 272, 479, 513, 302

[56] References Cited

U.S. PATENT DOCUMENTS

| | | | |
|---|---|---|---|
| 2,663,344 | 12/1953 | Burdick | 10/10 P |
| 3,227,198 | 1/1966 | Coyle | 411/304 |
| 3,914,178 | 10/1975 | Fineran et al. | 411/272 |

FOREIGN PATENT DOCUMENTS

| | | | |
|---|---|---|---|
| 522351 | 3/1956 | Canada | 411/479 |
| 372405 | 5/1932 | United Kingdom | 411/304 |

Primary Examiner—E. Michael Combs
Attorney, Agent, or Firm—Beehler, Pavitt, Siegemund, Jagger, Martella & Dawes

[57] ABSTRACT

A self-locking fastener includes an externally threaded fastener element provided with an aperture which is off-center with respect to the axis of the fastener element. Received within the aperture is a locking element which may be of plastic, preferably a polyimide such as VESPEL, for use under high temperature conditions. The aperture is preferably round while the locking element is preferably square, for ease of fabrication, although metal locking elements may be used and the aperture may be of other shapes. The length of the locking element is coordinated and correlated with the major and minor diameters of the fastener such that the end faces of the locking element substantially occupy a significant portion of the valleys between adjacent crests, rather than matching the thread profile, in order to provide effective locking as required by certain designated specifications set forth herein. Ease of fabrication is an advantage of the self-locking fastener as well as variety of configurations of the locking element, various forms of which are disclosed.

1 Claim, 3 Drawing Sheets

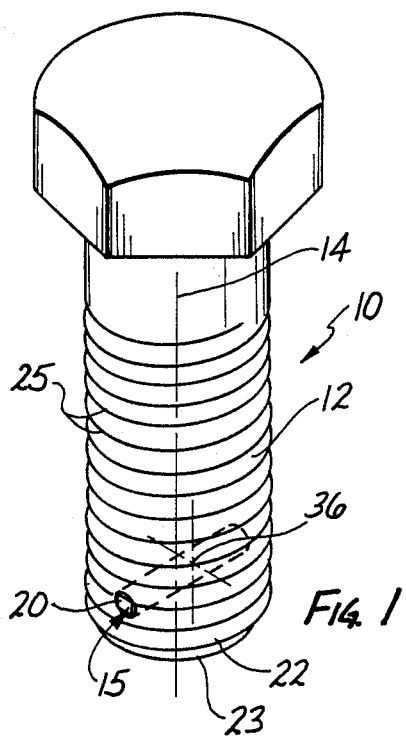
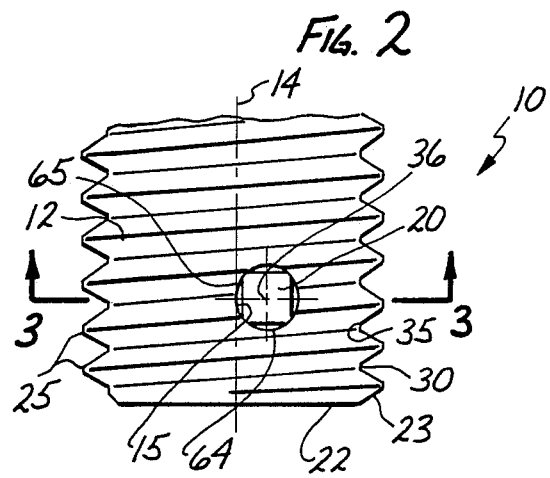
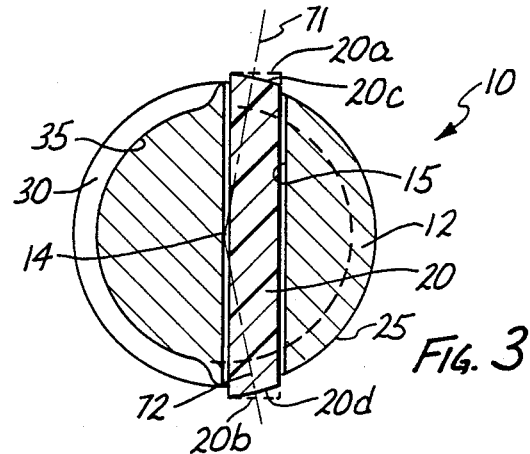
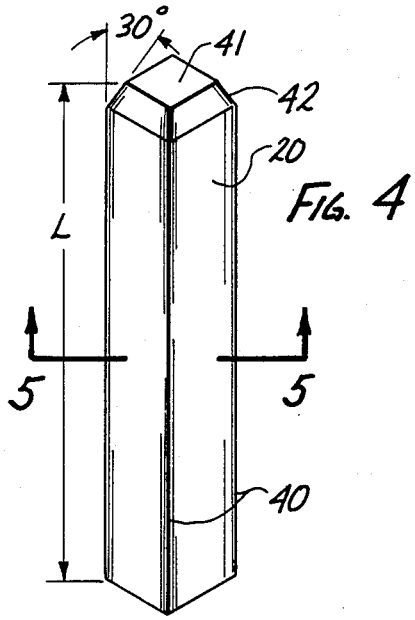
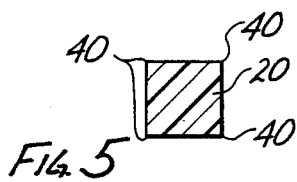
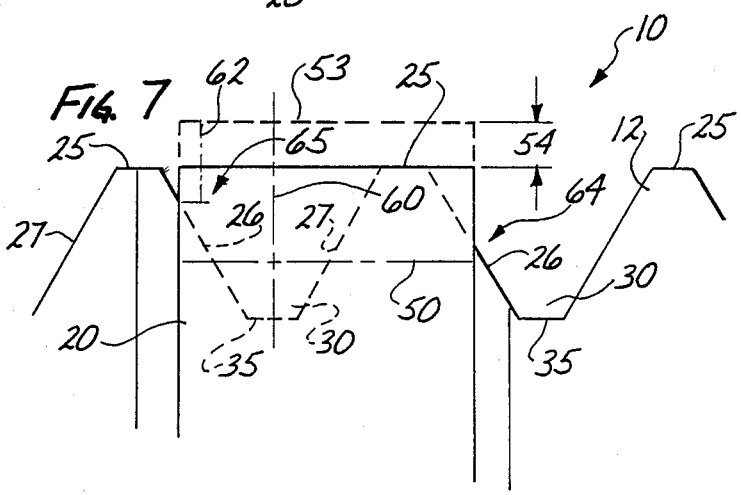

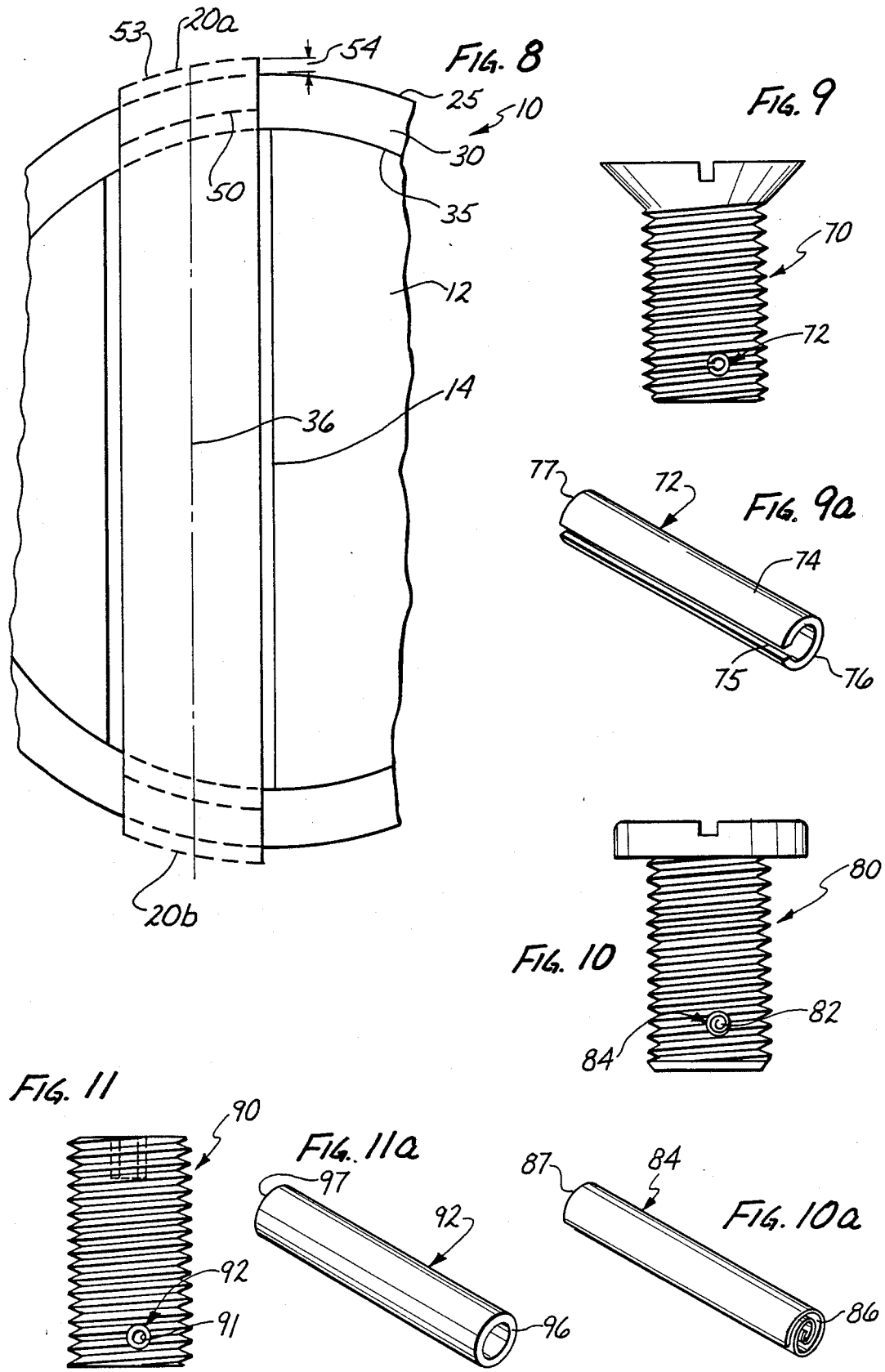

METHOD OF FORMING A SELF-LOCKING FASTENER

This is a division of application Ser. No. 629,200 filed July 9, 1984 abandoned.

FIELD OF INVENTION

This invention relates to self-locking fasteners and more particularly to an improved self-locking fastener which meets predetermined performance specifications, for example, MIL-F-18240, while substantially eliminating the prior problems of containment of the locking element, fracturing of the locking element and the generally low prevailing torque characteristics associated with certain types of materials used as the locking element and which are selected for use because of high temperature resistance and reuseability qualities.

DESCRIPTION OF THE PRIOR ART

Self-locking fasteners are well known in the prior art and generally fall into one of three categories. One such type, referred to in the MIL-F-18240 Specification, later referred to as Milspec, for convenience, is a Configuration A type of fastener in which a round or hexagonal slug is press-fitted into a blind hole of controlled diameter and depth. The height of the face of the pellet over the major diameter of the fastener is controlled such that the pellet acts as a wedge, creating increased thread-to-thread frictional contact 180 degrees from the pellet. The Milspec contains dimensional data related to the dimensions of the pellet, hole size and depth, as well as performance criteria for self-locking fasteners of Configuration A and of different sizes and thread dimensions.

Another general type of self-locking fastener is the Configuration B fastener of the Milspec, which may be either a strip or patch type of fastener. In the strip type of fastener, a plastic strip is press-fitted into a milled longitudinal slot whose depth, width and axial length are controlled. The height of the strip is again controlled such that the strip again acts as a wedge to cause increased thread-to-thread frictional contact 180 degrees from the strip. The patch type of device consists of a plastic patch heat bonded or fused or adhered to the surface or the threads, again of controlled dimensions, to act as a wedge as described. It is generally accepted that more than one locking element of the types described may be used, for example 90 degrees apart, in order to meet the performance requirements or the Milspec for fasteners ⅜ of an inch or larger in diameter.

In addition, the Milspec also sets forth criteria for maximum torque, minimum breakaway torque and the procedures of testing for the same, which values vary with the size of the fastener, and which values must fall within the defined limits from one fastener to the next for each of the types of fastener covered by the specification. Reuseability criteria are also set forth in the Milspec, the latter generally regarded as the prevailing performance and quality control specification for self-locking fasteners.

In addition to the self-locking fasteners covered by the Milspec, there are those made for the specific required performance specification of a particular user whose needs may be more severe than those set forth in the Milspec, or whose needs may be unique and not covered by the Milspec.

A typical such case is self-locking fasteners for use at elevated temperatures, e.g., above 250 degrees F., and as high as 550 degrees F., or more. The locking element is usually of plastic, although self-locking fasteners are known which do not use a plastic element. In the latter types of self-locking fasteners, the locking feature is obtained by some form of swaging of the fastener threads, and there are a number of prior patents which describe this type of self-locking fastener. There are also a substantial number of prior patents which deal with pellet, strip and patch type self-locking fasteners.

The materials used in patch, strip or pellet types of self-locking fasteners include the various types of nylon, for example, nylon 6 or nylon 66, PET, and a wide variety of other materials mentioned in the prior patents.

More recently, a polyimide plastic has received attention as a material for use in self-locking fasteners, one such typical material being that available under the trademark "VESPEL", although there are other sources of polyimide types of plastic materials. Due to the relatively high temperature performance of polyimide materials, such as VESPEL, e.g., as high as 550 degrees F., that material has been used as a strip or pellet element in self-locking fasteners, but with limited success.

More specifically, the mechanical properties of polyimide materials such as VESPEL are such that the performance of fasteners using a single pellet is limited. While higher torque may be achieved using additional pellets, as per the Milspec, this requires additional hole location and preparation steps which are not only difficult to hold consistently, from one fastener to the next, but these fasteners are costly to manufacture, even if consistent quality could be achieved. To remove the polyimide pellet, a drilling operation is required and this is a costly operation which, if not done with care and precision, may result in thread damage. Further, the diameter and depth of the hole for the pellet or pellets must be carefully controlled, in addition to the diameter and length of the pellet. This may be especially troublesome where multiple pellets are needed to meet the torque requirements, as for example those of the Milspec.

The mechanical properties of polyimides are significantly different from those of nylon 6/6 and a material available under the trademark "KEL-F", each of which has been used in strip type self-locking fasteners. VESPEL is harder and more brittle and less malleable than nylon or KEL-F and thus requires a closely held tolerance of the slot width. Further, the width of the insert must be closely controlled so that the resulting press fit between the strip and the slot is adequate to hold the strip firmly in the slot and at the same time not cause the insert to break-up when pressed into the slot.

It has been observed that a VESPEL strip design is particularly sensitive to variations in strip height and the minor diameter of the mating threads. Also, fracturing of the strips during assembly is a major concern. Once the strip begins to break-up, reuseability is adversely affected.

Prior designs using resilient materials such as nylon type plastics or KEL-F have been satisfactory for the intended purpose, subject to the limitations noted, since these materials are malleable, allowing the strip to conform to the shape of the slot, and being easily formed around the screw crest and flanks. In a sense, these prior materials are forgiving to the extent that the accuracy of the variations in the various dimensions is not as precise as is needed with polyimide materials such as VESPEL. It has been observed that if one merely substitutes VESPEL, for example, for nylon or KEL-F, the strips tend to move in the slot as the fastener is engaged with the mating threads. Further, there is fracturing and chipping of the insert when the fastener is assembled with mating threads.

Polyimide materials such as VESPEL cannot be applied to screw threads in the form of a patch since the material currently is only available commercially in the form of extruded rods.

It is known in the prior art to use various arrangements to hold a pellet into a fastener. For example, U.S. Pat. No. 2,520,121 of 1950 describes a self-locking fastener in which the pellet is threaded and is received in a threaded hole in the wall of the fastener. In another form, the ends of the thread surrounding the pellet are upset to form fingers which engage the pellet, the aperture being formed on the axis of the fastener which may include two apertures for a dual pellet system.

U.S. Pat. No. 2,663,344 of 1953 discloses a self-locking fastener in which an aperture is provided entirely through a blank which is later formed into the fastener body. A plastic locking insert is assembled into the aperture of the blank and thereafter, threads are rolled with the result that the ends of the locking insert are threaded as the outer surface of the blank is threaded. This operation results in a locking element which is threaded such that the minor and major diameter of its threads are slightly larger than the minor and major diameter of the metal threads, i.e., the threaded ends of the insert follow the contour of the metal threads but extend radially beyond the valleys and crests of the threads. Moreover, the rolling operation swages the insert portion of the metal threads surrounding the insert to form a mechanical lock with the insert. In one form, the aperture is formed off-center of the axis of the blank, with the ends of the insert again being threaded and being related to the metal threads, as described. As will be appreciated, the system described in this patent is relatively expensive and results in a self-locking fastener in which the material of the locking element is located in the wrong place for effective locking, i.e., the valley between adjacent flanks and crests of the metal threads contains only a minor amount of locking material.

From the above, it becomes apparent that a need exists for a relatively simple, effective and comparatively inexpensive self-locking fastener which is capable of meeting the Milspec and which may be fabricated to meet the specifications of various other users.

It is also advantageous to provide a self-locking fastener which permits the use of a wide variety of lockiing element materials, such as polyimides, such as VESPEL, other thermosetting or thermoplastic materials, and even metal locking elements of various configurations and compositions, including composite materials, if desired.

Quite obviously, a need exists for a self locking fastener which is capable of high temperature use and which, in all other respects, meets the criteria of the Milspec and which is relatively easily produced so as to provide a self-locking fastener whose quality is relatively easily controlled from one fastener to the next.

BRIEF DESCRIPTION OF THE INVENTION

In accordance with this invention, an improved self-locking fastener is provided, along with a relatively simple method of making the same, in which a single locking element is used and which is capable of providing improved torque qualities as compared with self-locking fasteners heretofore known in the prior art and one which may optionally be fabricated for use at relatively high operating temperatures.

In substance, the self-locking fastener of this invention includes an externally threaded fastener element, which may be any one of the threaded elements known in the art, having an aperture provided through the body and which is located off-center with respect to the axis of the fastener body. Received within the aperture is a locking element whose length is coordinated and correlated with the minor and major diameter of the screw threads such that each exposed face of the locking element projects radially outwardly beyond the minor diameter of the threads and is positioned in the valley and between the flanks of adjacent crests so as to provide substantial locking material at least in a portion of the valley between adjacent crests. In a preferred form, the end face of each end of the locking element projects not more than about 0.003 of an inch beyond the crest of the threads, as called for in the Milspec. In this way, a substantial amount of locking material is positioned in a location, relative to the fastener threads where it is effective to provide a locking action similar to that provided by pellets and strips. Since a single locking element is used, but which includes two spaced locking faces each of which is off-center with respect to the axis of the fastener, locking is achieved by a wedge action which creates increased thread-to-thread frictional contact on the side of the fastener opposite the locking faces. Since two locking faces are provided from a single element, the resulting torque is higher than could be obtained from the use of a single pellet, strip or patch, in a comparable size fastener. Moreover, since only a single aperture is formed, as described, control of the diameter and location of the aperture is comparatively simple, as compared to dual aperture or slot devices. Further, depth of the slot or aperture is not a variable which must be controlled since the aperture extends entirely through the body of the fastener and thus quality control is somewhat simplified.

Another important aspect of this is the fact that a wide variety of materials, including metals, may be used to form the locking element. Also, the present invention allows a wide variety of configurations which may be easily configured to meet the need, such as, unique materials for special requirements. Of particular importance in this invention is the fact that polyimide materials, such as VESPEL, may be used without some of the problems heretofore encountered with that type of material. For example, the dimensions of the locking element and those of the aperture need not be held as closely as the strip-slot and pellet-hole arrangements heretofore used. Further, as will be described, the locking element in accordance with this invention is not subject to the moving/sliding problems of the prior devices or fracturing and falling out of the slot or hole between reuses. Replacement of the locking element is also simplified in that it involves pressing-out the old element and pressing-in a new element. Drilling, as was needed for pellet type structures, is eliminated.

Fabrication of the fastener is also simplified, while reducing the dependency on multiple closely held tolerances. Thus, a hole is drilled off-center through the fastener with care not to provide burrs, and an appropriately dimensioned locking element is pressed into the aperture, optionally followed by a relatively simple finishing operation which involves grinding the end faces of the locking element to dimension.

The above advantages of this invention, and many others, are made more clearly apparent from a consideration of the several forms in which it may be embodied. Such forms are shown in the drawings accompanying and forming a part of the present specification. These forms will be described in detail for the purpose of illustrating the general principles of the invention; but it is to be understood that such detailed description is not to be taken in a limiting sense.

BRIEF DESCRIPTION OF THE DRAWINGS

FIG. 1 is a view in perspective of a self-locking fastener in accordance with this invention;

FIG. 2 is an enlarged fragmentary view of a portion of a self-locking fastener in accordance with this invention;

FIG. 3 is a view, partly in section and partly in elevation, taken along the line 3—3 of FIG. 2;

FIG. 4 is a view in perspective of a locking element for use in accordance with this invention;

FIG. 5 is a sectional view taken along the line 5—5 of FIG. 4;

FIG. 6 is a diagrammatic view, on a much enlarged scale, illustrating the relationship between the locking element and the aperture in which it is received, in accordance with this invention;

FIG. 7 is a diagrammatic view, again on a much enlarged scale, illustrating the relationship between the face of the locking element and the associated threads, in accordance with this invention;

FIG. 8 is another enlarged view, not necessarily to scale, for the purpose of illustrating the relation between the locking element and fastener of this invention;

FIG. 9 is a view in perspective of another form of self-locking fastener in accordance with this invention;

FIG. 9a is a view of the locking element of the self-locking fastener illustrated in FIG. 9 hereof;

FIG. 10 is a view of still another form of self-locking fastener in accordance with this invention;

FIG. 10a is a view in perspective of the locking element of the self-locking fastener illustrated in FIG. 10 hereof;

FIG. 11 is a view of yet another form of a self-locking fastener in accordance with this invention;

FIG. 11a is a view in perspective of the locking element of the self-locking fastener of FIG. 11 hereof;

DETAILED DESCRIPTION OF THE INVENTION

Figure 12:
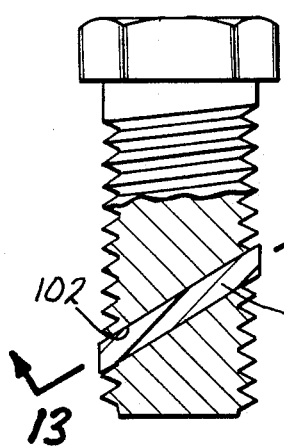
FIG. 12 is a view, partly in section and partly in elevation, of an additional form of self-locking fastener in accordance with this invention.

Referring to the drawings which illustrate forms of the preferred embodiment of this invention, FIG. 1 illustrates a self-locking fastener 10 in accordance with this invention which may include an externally threaded fastener element 12, which may be of any of the types currently known. In the form illustrated, the element 12 is a hexagonal headed threaded bolt, although the invention is not limited thereto. The element includes a center axis 14 and is provided with an aperture 15, located off-center with respect to the axis 14, the aperture extending clear through the threaded shank of the element. In the form illustrated, the aperture is circular in cross-section and receives a locking element 20 which may be of any of the materials to be mentioned. In the form shown in FIG. 1, the locking element is shown as a single unitary element and extends clear through the fastener, from one side thereof to the other, as will be described. The fastener includes a leading end 22, the aperture being spaced from the leading end 22 such that there are threads available for engagement with a mating threaded member, for example one complete thread plus the unthreaded portion of the end, usually chamfered as illustrated at 23.

As shown in FIGS. 2 and 3, and especially FIG. 7, the threads include crests 25 with adjacent flanks 26 and 27 and valleys 30 between facing flanks 26 and 27. The valleys include a base 35 such that the minor diameter of the fastener is the diameter at the base and the major diameter is the diameter at the crests 25. The aperture 15, which may be circular, as shown, extends entirely through the body of the fastener and may be located such that the center 36 thereof is spaced from the end 22 of the element a distance as set forth in the Milspec or NAS 1283 or any other specification. In the form illustrated, the axial dimension of the aperture may preferably be such that it extends axially across adjacent crests 25 or at least across a crest 25 and adjacent flanks 26 and 27. For the purposes of this invention it is immaterial whether the center or mid-point 36 of the aperture is centered on a crest, on the base 35 or on a flank. Further, the axial dimension of the aperture may traverse two or more crests of the element, as may be needed to obtain the desired torque for any size fastener element.

In the form shown in FIGS. 2 and 3, the center 36 of the circular aperture 15 is displaced or off-center with respect to the center axis 14 of the element 12 and in this form, the outer periphery is shown tangent to the center line 14. For reasons which will be discussed, it is preferred that the aperture be located such that none of the aperture extends over the center line of the fastener element, provided that the diameter of the fastener is such as to permit the same. In any event, the center axis of the aperture is off-set, as described. In the form illustrated, the aperture is circular and the locking element 20 may be square in cross-section, as illustrated, see also FIG. 5, such that a plurality of spaced contact regions 40 are provided along the length and along the outer surface of the locking element and which engage the wall of the aperture at spaced locations along its length, as shown.

Referring to FIGS. 2-6, the locking element 20 may initially be of a length greater than the major diameter of the element 12 and one end 41 of the element 20 may be tapered as at 42, for example 30 degrees on a side, as illustrated. The purpose of the taper is to ease assembly of the locking element to the fastener element 12, since assembly is primarily a press-fitting operation in which the tapered end of the element 20 is inserted into the aperture and the element is forced in until the ends 20a and 20b are positioned beyond the major diameter of the fastener as shown in FIG. 3. Since the ends 20a and 20b are square in cross-section, the ends may be contoured to follow the contour of the fastener. This involves removing a portion of the ends 20a and 20b, shown as the stippled portion 20c and 20d in FIG. 3, by a simple grinding operation.

The cross-sectional dimension of the locking element 20 may vary depending upon the material used. For example, for resilient type materials such as the various types of nylon or KEL-F or other similar thermoset or thermoplastic materials, the transverse dimension of the locking element, as measured across diametrically aligned contact regions 40, may be somewhat larger than the diameter of the aperture 15 so that there is a high degree of press fit to hold the locking element in place. Where more frangible types of materials are used, such as polyimides, for example VESPEL, and which are not as resilient, the transverse dimension of the locking member should be a few thousandths of an inch greater than the diameter of the aperture in order to prevent breakage during the force fitting operation. Various plastic materials may be used, as described, for example in U.S. Pat. No. 3,784,435 of 1974, and filled plastic materials may be used, as desired. It is understood, however, that the present invention is not limited to the above materials, although specific advantages accrue with the use of polyimides such as VESPEL.

As shown in FIGS. 2 and 6, there are portions of the outer surface of the locking element 20 which are not in contact with the opposed wall of the aperture. Even so, there is good locking contact and this arrangement simplifies assembly of the locking element to the fastener element, a particular advantage with the less resilient materials such as polyimides, for example, VESPEL Referring now to FIGS. 7 and 8, the final length of the locking element is coordinated and correlated with the minor and major diameter of the fastener such that faces 20a and 20b preferably extend radially beyond the base 35 of the valleys and preferably not more than a minor amount beyond the crests of the thread. Thus, the locking element may be as short as is indicated at 50 or sufficiently long to extend beyond the crests as at 53, the dimension 54 being 0.003 of an inch greater than the thread nominal major diameter, or less. It is preferred that the end faces 20a and 20b be at the same level as the crests, i.e. the length of the locking element is equal to the major diameter. Regardless of the length of the locking element with respect to the major and minor diameters of the fastener element, within the range specified, it is an important feature of this invention to assure that there is a substantial amount of the locking element end face located in the valleys 30 between adjacent crests. The reason for this, especially with the more brittle materials such as VESPEL, is due to the nature of the desired locking action.

More specifically, it is desired that the locking element operate to create frictional engagement of the mating threads opposite, or 180 degrees relative to the end faces of the locking element. Mere frictional engagement between the end faces of the locking element and the threads of the mating element is not an effective manner in which to achieve the self-locking feature. Thus, to locate locking material as a coating, in effect on the flanks, valleys and crests of the fastener, as may be achieved by forming the end faces with threads thereon which are complimentary to the thread configuration, see the U.S. Pat. No. 2,663,344, above, is not as effective as placing a major amount of the material of the locking element in the valleys.

Referring to FIGS. 2, 7 and 8, it can be seen that there is a significant amount of material in the valleys and that the dimension of the locking element, measured radially outwardly, from the base 35 of the valley to the exposed face is at a maximum, as indicated at 60, while the corresponding measurement from the flank, as indicated at 62, is the minimum. It is within the scope of the present invention to crown the free ends of the locking element or alternatively to dish them slightly, provided there is a substantial amount of material in the valleys. It is also possible, depending upon the location of the aperture relative to the thread crest, that only a portion of a valley is filled, see for example FIG. 2. There, one valley is partially filled while the adjacent valley 65 is almost completely filled. It is for this reason that the axial length of the aperture should extend at least a length which minimally is the crest-to-crest dimension.

Referring now to FIG. 8, the aperture is located off-center, as described, and it is preferred that the entire aperture be off-center. More specifically, as the center line of the aperture approaches the center line of the fastener, the effectiveness of the previously defined self-locking action is reduced. Ideally, in theory, the aperture should be as far from the center axis as is possible. However, if positioned too far off-center, practical problems arise in that there may be objectionable thread deformation during formation of the aperture. While a minor amount of thread deformation may not be objectionable, and may even assist in locking, there is a tendency to cause thread galling during assembly to a mating member which may be objectionable. To facilitate assembly to a mating member and to reduce the possibility of fracture of the more frangible materials, the end faces 20a and 20b may be contoured to follow the outer peripheral contour of the threads, as shown in FIG. 8.

It will be seen from FIGS. 3 and 8 that the center line of the locking element is displaced from the center axis of the fastener element. In this way, spaced contact regions are provided on the end faces which are preferably between 130 and 170 degrees apart, as indicated at 71 and 72 in FIG. 3, and which bear against the threads of the mating fastener element. In this way, the contact regions cause relative displacement of the fastener and the mating fastener such that the mating threads opposite the contact regions of the locking element are in metal-to-metal frictional engagement. The smaller angle represents a greater distance of the center axis of the locking element from the center axis of the fastener element and thus represents a greater displacement of the contact regions from the center axis of the fastener element and tends to cause greater relative displacement of the mating parts. Accordingly, all other factors being equal, the smaller the angle, the greater the tendency of the contact regions of the locking element to cause frictional locking, assuming the locking regions are configured as set forth with respect to the threads of the fastener in which they are mounted. As a practical matter, however, the contact regions should be located such that the aperture is relatively straight and not off-center to such an extent as to cause galling of the mating threads, except where galling is not a critical factor in performance.

In manufacture of the self-locking fastener of this invention, the final step is to trim the end faces to the proper dimension. This may be easily accomplished by a grinding operation. Typically, the locking element is initially longer than the major diameter of the fastener. Further, since the locking element is preferably square in cross-section and the aperture is preferably round and only one aperture is used, the need for closely held tolerances in forming the aperture and locking element blank is largely avoided.

A series of self-locking fasteners made in accordance with this invention, as previously described, were fabricated and tested to determine performance against the Milspec. The locking element was VESPEL, assembled as described in a ¼—20 fastener element. The dimensions of the resulting self-locking fastener followed the Milspec, except that the aperture was as described and in accordance with this invention. The fastener had a major diameter of 0.494 of an inch as was tested with a nut having a minor diameter of 0.449 of an inch. The maximum prevailing torque for this type bolt is 150 inch pounds, while the breakaway torque (min.), first off, is 18 inch pounds, both as set forth in the Milspec. In actual testing for reusability of the same size self-locking fastener in accordance with this invention, the data were as follows:

Prevailing torque, first on, was 55 inch pounds. The breakaway torque, in inch pounds, for each reuse was as follows:

| 1st  | 42   | 31st (oil added) | 25   |
|------|------|------------------|------|
| 2nd  | 40   | 32nd             | 24.5 |
| 3rd  | 39   | 33rd             | 24   |
| 4th  | 37.5 | 34th             | 24.5 |
| 5th  | 38   | 35th             | 25   |
| 10th | 39   | 40tn             | 23   |
| 15th | 39   | 45th             | 21.5 |
| 16th | 39   | 46th             | 18.3 |
| 17th | 39   | 47th             | 19   |
| 18th | 40   | 49th             | 18.4 |
| 19th | 40   | 50th             | 18   |
| 20th | 40   | 55th             | 17.5 |
| 25th | 40   |                  |      |
| 30th | 40   |                  |      |

In another series of tests, the self-locking fastener in accordance with this invention was heated for two hours at 500 degrees F. and then torque tested. This test was done on a comparative basis using a ¼—28 size bolt in which one pair was fabricated in accordance with this invention and the second pair had the aperture positioned on center. One of each pair was tested without heat soaking and another of each pair was tested after heat soaking. Again, the allowable range of just-on torque and just-off torque, for this size bolt, as per the Milspec, were 30 and 3.5, respectively. The data for the fastener in accordance with this invention are:

| Sample | Type | Prevailing Torque 1st on | Breakaway Torque | | | | | | |
|---|---|---|---|---|---|---|---|---|---|
| | | | 1st | 2nd | 3rd | 4th | 5th | 10th | 15th |
| 1 | center | 11 | 7.5 | 5 | 4.8 | 4.6 | 4.5 | 4.5 | 4.5 |
| 2 | off-center | 16 | 10.5 | 9 | 8 | 9.5 | 9 | 10 | 10 |
| HEAT SOAK TEST AFTER 500 degrees F. for 2 hrs. | | | | | | | | | |
| 3 | center | 11.7 | 9.8 | 5.1 | 5 | 5.1 | 5 | 3.6 | 3 |
| 4 | off center | 16.1 | 15 | 7 | 6.5 | 6.8 | 5.5 | 5.8 | 4 |

The above values were measured in inch pounds.

A second heat soak test was performed, this time on ⅜—24 size fasteners. Again a pair of fasteners were tested, one formed on center and the other formed off center, in accordance with this invention. As with fasteners 1–4 above, the locking element was VESPEL in each case.

The allowable range of first on torque and first off torque, for this size bolt, as per the Milspec, were 80 and 9.5, respectively. The data for the fastener in accordance with this invention are:

| Sample | type | Prevailing Torque 1st on | Breakaway Torque | | | | |
|---|---|---|---|---|---|---|---|
| | | | 1st | 2nd | 3rd | 4th | 5th |
| 5 | center | 25 | 18 | 10 | 10 | 8.5 | 7.7 |
| 6 | off center continued | 29.5 | 19.5 | 17 | 14.6 | 13 | 12 |
| | | | 10th | | 15th | | |
| 5 | | | 6.5 | | 6.5 | | |
| 6 | | | 12 | | 11.4 | | |

Again, all values are in inch pounds, and the time and temperature of heating are as previously specified.

The above data are interesting in terms of the criteria of the Milspec. More specifically, the ½ fastener qualified and remained qualified through 50 reuses and fell just below specification between the 51st and 55th reuse. In the case of Numbers 1 and 2, both remained qualified after 15 reuses, but Number 2 showed more than twice the torque value of Number 1, tending to indicate that Number 1 was coming to the end of its reuse life while Number 2 retained significantly more usefule life. In the heat soak test of Numbers 3 and 4, Number 3 barely qualified after 10 reuses and was not qualified at the 15th reuse. In contrast, Number 4 remained qualified at 15 reuses with some margin to spare. The heat soak tests of Numbers 5 and 6 confirmed the accuracy of the data with respect to Numbers 3 and 4. Number 5 would not have qualified at the 4th reuse while Number 6 remained qualified at the 15th reuse, again with a considerable margin to spare. These data in the heat soak tests tend to establish the superior performance of fasteners in accordance with this invention in an elevated temperature environment, e.g., rocket and engine areas where there is a relatively high build-up.

In the form of the invention illustrated in FIGS. 9 and 9a, the self-locking fastener 70 includes a metallic locking element 72, again located off-center, as illustrated. The locking element may be what is commonly known as an expansion pin which is a tubular element 74, slotted along its length as indicated at 75 such that it is compressible. Insertion into the aperture is easily achieved by compressing the expansion pin, maintaining it compressed until properly located in the aperture and then releasing it. Since the expansion pin may be formed accurately to the desired length with relation to the major and minor diameter of the fastener element, as already described, it may not be necessary to finish the end faces 76 and 77 to the desired dimension. Again, as described, the length of the expansion pin is preferably such that it includes end face portions that are located in the valleys between adjacent crests, as described above, and preferably such that a substantial portion of the end faces are available for locking action.

Another form of self-locking including a metallic locking element is illustrated in FIGS. 10 and 10a in which the self-locking fastener 80 again includes an off-center aperture 82 which receives a metallic locking element 84 in the form of a spring pin. The spring pin is in effect a coiled spring, made for example of 1070 carbon steel. The spring pin includes multiple coils of a relatively thin sheet, the coils being compressible for insertion into the aperture with the member being retained by tight engagement with the wall of the aperture as the spring pin expands. As with the expansion pin, above, assembly is as described with reference to the structure of FIGS. 9 and 9a, and again the locking element includes end faces 86 and 87 which act as the locking faces, as already described. The metallic locking element may also take the form of a cylindrical solid soft metallic rod, for example, brass. The metal rod may be of any of the various shapes herein described.

The self-locking fastener of FIGS. 11 and 11a includes a fastener element 90 in the form of an internal hex-head fastener, again provided with an off-center aperture 91 having a locking element 92 received therein. The locking element may be a tubular plastic member fabricated of any of the plastic materials mentioned. Again, the element 92 includes end faces 96 and 97 whose function and location relative to the major and minor diameter of the fastener should be as previously described.

Figure 13:
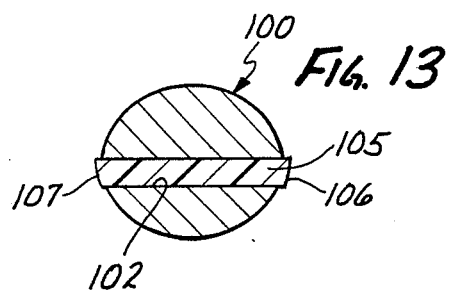
FIG. 13 is a sectional view taken along the line 13—13 of FIG. 12.

It is also possible, in accordance with the present invention, to provide a self-locking fastener 100, as illustrated in FIGS. 12 and 13, wherein the aperture 102 is off-center, as described, and at an angle relative to the horizontal axis of the fastener element. Due to the sectional view of FIG. 13, the fastener appears to be elliptical, but is in fact round. As described, the locking element 105 may be any of those already described or disclosed herein, with the end faces 106 and 107 angled appropriately to function in the manner already described. The end faces are dimensioned to provide a substantial amount of locking material in the valleys between adjacent crests, as discussed.

Figure 15:
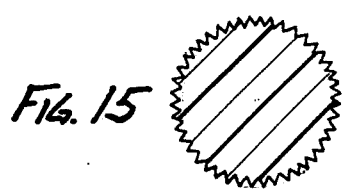
FIG. 15 is a sectional view of still another form of locking element for use in a self-locking fastener in accordance with this invention.
Figure 14:
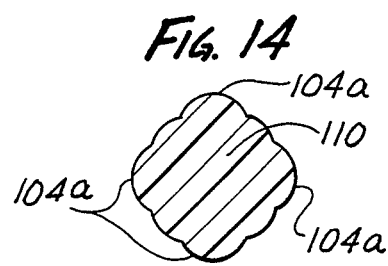
FIG. 14 is a sectional view of another form of locking element for use in a self-locking fastener in accordance with this invention.

It is apparent that the locking element may take various shapes, as shown for example in FIGS. 14 and 15. Locking element 110 includes a plurality of spaced nubbins 104a, for reception in a circular aperture, off-center, as described. Also useable is a locking element 115 whose outer surface is serrated, as indicated at 118.

Figure 16:
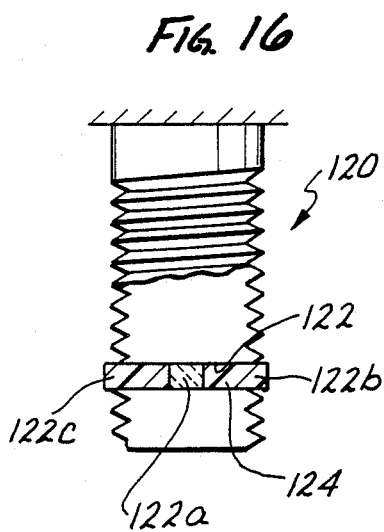
FIG. 16 is a view, partly in section and partly in elevation, of yet another form of self-locking fastener in accordance with this invention.
Figure 16A:
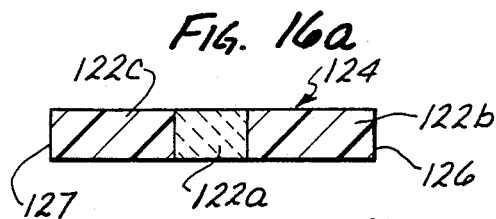
FIG. 16a is an enlarged view of the locking element of the self-locking fastener of this invention as illustrated in FIG. 16.
Figure 17:
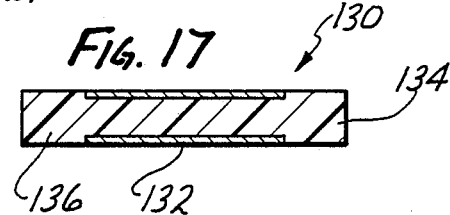
FIG. 17 is an enlarged view, in section, of yet another form of locking element for use in the present invention.

As shown in FIGS. 16, 16a and 17, the locking element may be made up of several pieces of the same or different material. For example, the locking element 120 of FIG. 16 which is received in the off-center aperture 122 of the self-locking fastener 124 may be made up of a center metallic member 122a and end pieces 122b and 122c which are of plastic, for example. In this case, the center element 122a may function as a spacer and be of a configuration or dimension which is easily received within the aperture, for example, circular in cross-section and slightly under diameter compared to the aperture, while the end pieces may be square. Such an arrangement may be used in those cases where the material of the end faces 126 and 127 is comparatively expensive, as may be the case where unique properties are needed. One such instance is where out-gassing of the materials is of concern, for example in deep space. The overall dimensions of the locking element and the relation of the end faces to the major and minor thread dimensions, should preferably be as already described.

FIG. 17 illustrates a locking element in accordance with this invention which is unitary in structure but composed of multiple parts. The locking element 130 includes a sleeve 132 which receives end pieces 134 and 136, the latter provided with shoulders as shown to accommodate the sleeve. The end pieces may be of the same external geometry or different from that of the sleeve, e.g., a circular sleeve with square shaped end pieces. This type of locking element has the advantage of being easily configured or made up of a variety of materials as may be needed for any special use.

Figure 19:
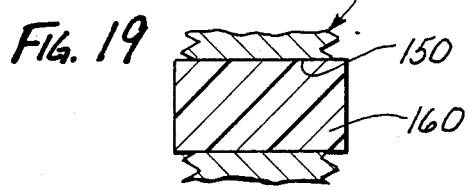
FIG. 19 is a sectional view taken along the line 19—19 of FIG. 18, hereof.
Figure 18:
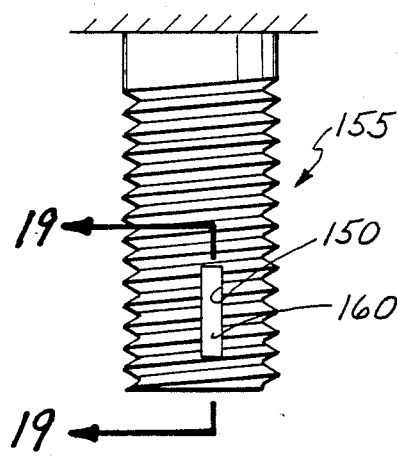
FIG. 18 is a view, partly in section and partly in elevation, of another form of self-locking fastener of this invention.

In the form of the present invention illustrated in FIGS. 18 and 19, the aperture 150 of the self-locking fastener 155 is in the form of a slot, again off-centered, and extending clear through the fastener body. This particular self-locking fastener is similar to the Class B strip fastener but incorporates the structure and advantages of the present invention. Not only is torque increased, but weakness of the fastener element is somewhat reduced since the axial and transverse dimensions of the slot are quite variable. The locking element 160 may be of plastic or metal and may even be ribbed along its transverse face or faces for securing it to the fastener element. Undulating spring elements may be used such that the crests of the locking element are in locking engagement with the aperture walls to retain the locking element in the aperture.

It will be apparent from the foregoing detailed description that various modifications and alterations may be made, as will be recognized by those skilled in the art based on the foregoing description, and that the same are within the scope of the present invention as set forth in the appended claims.

I claim:

1. A method of fabricating a self-locking fastener of the type described having a temperature stability of up to about 550 degrees F., comprising:

providing a pre-threaded externally threaded fastener element which includes at least a portion of the outer surface which is threaded and which includes crests with adjacent flanks and valleys therebetween, providing a circular aperture through said externally threaded fastener element which is off-center with respect to the center axis of said fastener element and which extends from one side thereof to the other, providing a non-circular locking element of a polyimide plastic material having a temperature stability of up to about 550 degrees F. and being proportioned to be received and locked into said aperture, said locking element being provided with a pair of opposed end faces, at least one of said end faces being tapered to facilitate insertion of said locking element into said aperture, and wherein the length of the locking element is greater than the major diameter of the fastener element, assembling said locking element into the aperture of said fastener element by inserting said locking element into said aperture in a manner wherein said tapered end face is first positioned therein, continuing to forcibly insert said locking element into said aperture and press fitting the same completely into said aperture such that said end faces of said locking element are positioned radially beyond said valleys and said crests and are spaced from each other and form an angle therebetween of between 130 and 170 degrees as measured along the threaded periphery of said fastener, said locking element being retained in said aperture by said press fit, and thereafter finishing said end faces of said locking element such that said end faces are positioned radially beyond said valleys but not more than a predetermined distance of about 0.003 of an inch beyond the crests of said threads.

* * * * *